US012683101B2

(12) United States Patent
Katoh

(10) Patent No.: US 12,683,101 B2
(45) Date of Patent: Jul. 14, 2026

(54) SWITCH APPARATUS AND ELECTRONIC EQUIPMENT

(71) Applicant: CASIO COMPUTER CO., LTD., Tokyo (JP)

(72) Inventor: Hirokatsu Katoh, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 368 days.

(21) Appl. No.: 18/241,407

(22) Filed: Sep. 1, 2023

(65) Prior Publication Data

US 2024/0087824 A1 Mar. 14, 2024

(30) Foreign Application Priority Data

Sep. 13, 2022 (JP) ................................ 2022-145348
Jul. 28, 2023 (JP) ................................ 2023-122939

(51) Int. Cl.
*H01H 13/14* (2006.01)
*H01H 13/20* (2006.01)
*G10H 1/00* (2006.01)

(52) U.S. Cl.
CPC ............ *H01H 13/14* (2013.01); *H01H 13/20* (2013.01); *G10H 1/0008* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 19/11; H01H 2003/085;
(Continued)

(56) References Cited

U.S. PATENT DOCUMENTS 11,170,954 B2 11/2021 Sugisawa et al.
2005/0226669 A1* 10/2005 Cheng .................... H01H 13/84 400/490

(Continued)

FOREIGN PATENT DOCUMENTS

JP 2000243172 A 9/2000
JP 2017045608 A 3/2017

(Continued)

OTHER PUBLICATIONS

Japanese Office Action (and an English language translation thereof) dated Aug. 6, 2024, issued in counterpart Japanese Application No. 2023-122939.

*Primary Examiner* — Ahmed M Saeed
(74) *Attorney, Agent, or Firm* — Holtz, Holtz & Volek PC

(57) ABSTRACT

A switch apparatus includes a case, a button provided on the case and can be operated by pushing from a first direction, and a shaft provided in a space within the case and configured to move together with the button along an axial direction in response to an operation on the button, wherein, within the space, at least one magnet is fixed to either the case or the shaft, and at least one magnetic body is fixed to a remaining one, and wherein the at least one magnet and the at least one magnetic body are attracted to each other by a magnetic force along the axial direction in a first state in which the button protrudes from the case in the first direction more than in a second state.

10 Claims, 7 Drawing Sheets

(58) Field of Classification Search
CPC .. H01H 2003/506; H01H 3/08; G10H 1/0008; G10H 1/0555; G10H 1/46
See application file for complete search history.

(56) References Cited

U.S. PATENT DOCUMENTS

| | | | | |
|---|---|---|---|---|
| 2007/0219409 | A1* | 9/2007 | Shimizu ................. | A61B 1/045 600/101 |
| 2016/0042897 | A1* | 2/2016 | Qian ...................... | H01H 13/85 335/207 |

FOREIGN PATENT DOCUMENTS

| | | | |
|---|---|---|---|
| JP | 2018055935 | A | 4/2018 |
| WO | 2019138644 | A1 | 7/2019 |

* cited by examiner

SWITCH APPARATUS AND ELECTRONIC EQUIPMENT

CROSS-REFERENCE TO RELATED APPLICATION

This patent application is based upon and claims the benefit of priority under 35 USC 119 of Japanese Patent Application No. 2022-145348 filed on Sep. 13, 2022, and Japanese Patent Application No. 2023-122939 filed on Jul. 28, 2023, the entire disclosure of which, including the specification, claims, drawings and abstract, is incorporated herein by reference in its entirety.

BACKGROUND

Technical Field

The present disclosure relates to a switch apparatus and electronic equipment.

Description of the Related Art

There has conventionally been proposed electronic equipment such as an electronic instrument or the like which includes a switch apparatus for making and breaking a connection (on/off operations) in the electronic instrument by a push unit of the switch apparatus being pushed. In this type of switch apparatus, there is known a switch apparatus configured to perform alternate operations in which a push unit is held protruding in one of an on state and an off state, while the push unit is held recessed in the other of the on state and the off state. For example, Japanese Unexamined Patent Application Publication No. 2000-243172 (JP-A-2000-243172) discloses a power supply state confirmation apparatus having a confirmation button, a stand-still spring, an electromagnet, and a permanent magnet. In this power supply confirmation apparatus, the confirmation button is held protruding from an equipment surface as a result of a repulsion between the electromagnet and the permanent magnet in an on state, while the confirmation button is held recessed from the equipment surface as a result of being biased by the stand-still spring in an off state. As a result, the on or off state of the power supply can be confirmed only by touching the confirmation button.

SUMMARY

According to an aspect of the present disclosure, there is provided a switch apparatus including a case, a button provided on the case and can be operated by pushing from a first direction, and a shaft provided in a space within the case and configured to move together with the button along an axial direction in response to an operation on the button, wherein, within the space, at least one magnet is fixed to either the case or the shaft, and at least one magnetic body is fixed to a remaining one, and wherein the at least one magnet and the at least one magnetic body are attracted to each other by a magnetic force along the axial direction in a first state in which the button protrudes from the case in the first direction more than in a second state.

An electronic instrument of the present disclosure includes the switch apparatus described above.

BRIEF DESCRIPTION OF THE DRAWINGS

FIGS. 7A and 7B are perspective views showing only the push unit, the first shaft unit, and the case unit of the volume knob according to the embodiment, wherein FIG. 7A is a perspective view in the off state, and FIG. 7B is a perspective view in the on state.

DESCRIPTION OF THE EMBODIMENT

Figure 1:
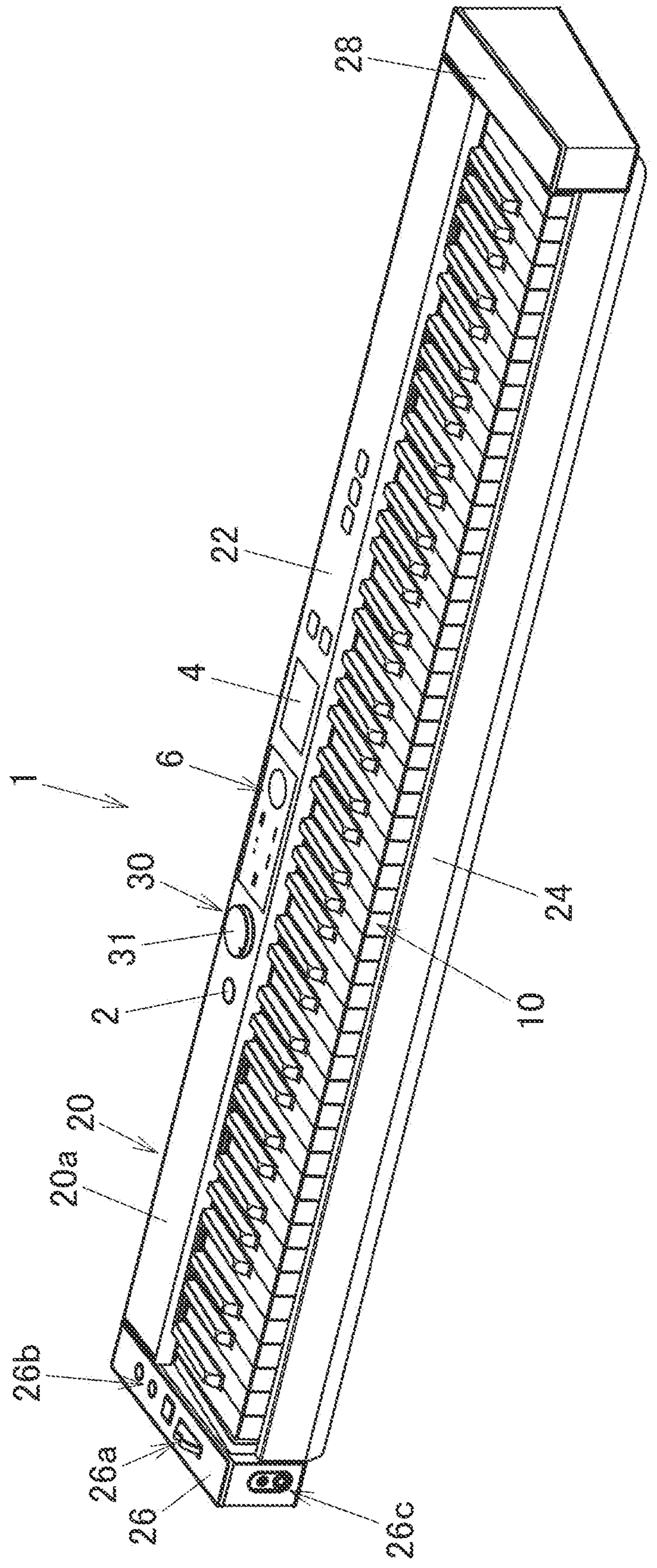
FIG. 1 is an overall perspective view of an electronic keyboard instrument according to an embodiment of the present disclosure.

Hereinafter, referring to drawings, an embodiment of the present disclosure will be described. An electronic keyboard instrument (electronic equipment such as an electronic instrument) 1 shown in FIG. 1 includes a keyboard 10 having multiple keys such as white keys and black keys, and a case 20. A control circuit board, not shown, and the like are accommodated in an interior of the case 20. In the following description, a key arrangement direction in which the multiple keys of the electronic keyboard instrument 1 are lined up is referred to as left-right direction (in FIG. 1, a left case 26 is disposed in a leftward direction), a front-back direction of each key is referred to as a front-back direction (in FIG. 1, a side where the keyboard 10 is provided relative to an operation panel 6 is directed in a forward direction), and an up-down direction of the electronic keyboard instrument 1 is referred to as an up-down direction (axial direction) (in FIG. 1, an upper surface side of an upper case 22 is directed in an upward direction (first direction)).

As viewed from above, the case 20 has substantially a horizontally elongated rectangular shape in which the left-right direction constitutes a longitudinal direction of the whole of the keyboard 10. The case 20 has the upper case 22, a lower case 24, the left case 26, and a right case 28. At least the upper case 22 is formed from a synthetic resin of a color in a white color system or a yellow color system. For example, the white color system includes colors of ivory, beige, Torinoko (light yellow), Gofun (yellowish white), milky white, Kinari (a color of unbleached linen), snow white (blueish white), and the like (the colors of Torinoko, Gofun, and Kinari are Japanese traditional colors), and a color is selected for the case 20 so as to match the design thereof. An upper surface (a first surface) of the upper case 22 constitutes an upper surface panel 20*a* containing an acrylic resin which transmits visible lights.

A power supply button 2 for switching on and off a power supply for the electronic keyboard instrument 1, a liquid crystal display 4, and the operation panel 6 where an illumination area, a touch switch, and the like are disposed are provided on the upper surface of the upper case 22. In addition, a volume knob (a switch apparatus) 30 is provided between the power supply button 2 and the operation panel 6. This volume knob 30 is configured to control an electric circuit such as an amplifier for generating a note sound so as to electrically control the volume of a note sound to be generated thereby. A pitch bender 26*a* for controlling a note sound by imparting a pitch bend to the note sound, setting buttons 26*b* for various settings, and the like are provided on an upper surface of the left case 26. An earphone jack 26*c* is provided in a front surface of the left case 26. The electronic keyboard instrument 1 includes a processor, and when the power supply is switched on, the processor causes the control panel 6 to be illuminated.

Figure 2:
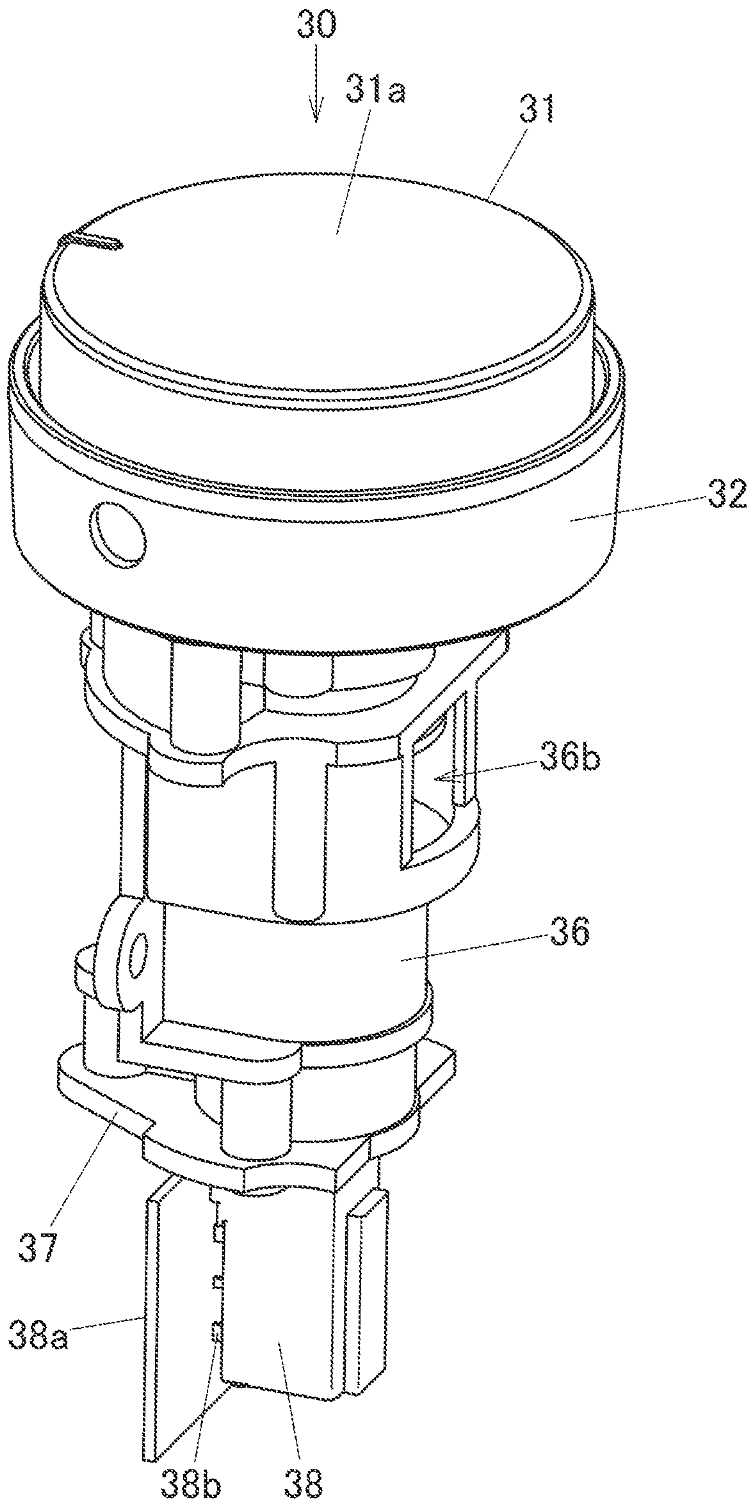
FIG. 2 is a perspective view of a volume knob according to the embodiment as viewed obliquely from above.
Figure 3:
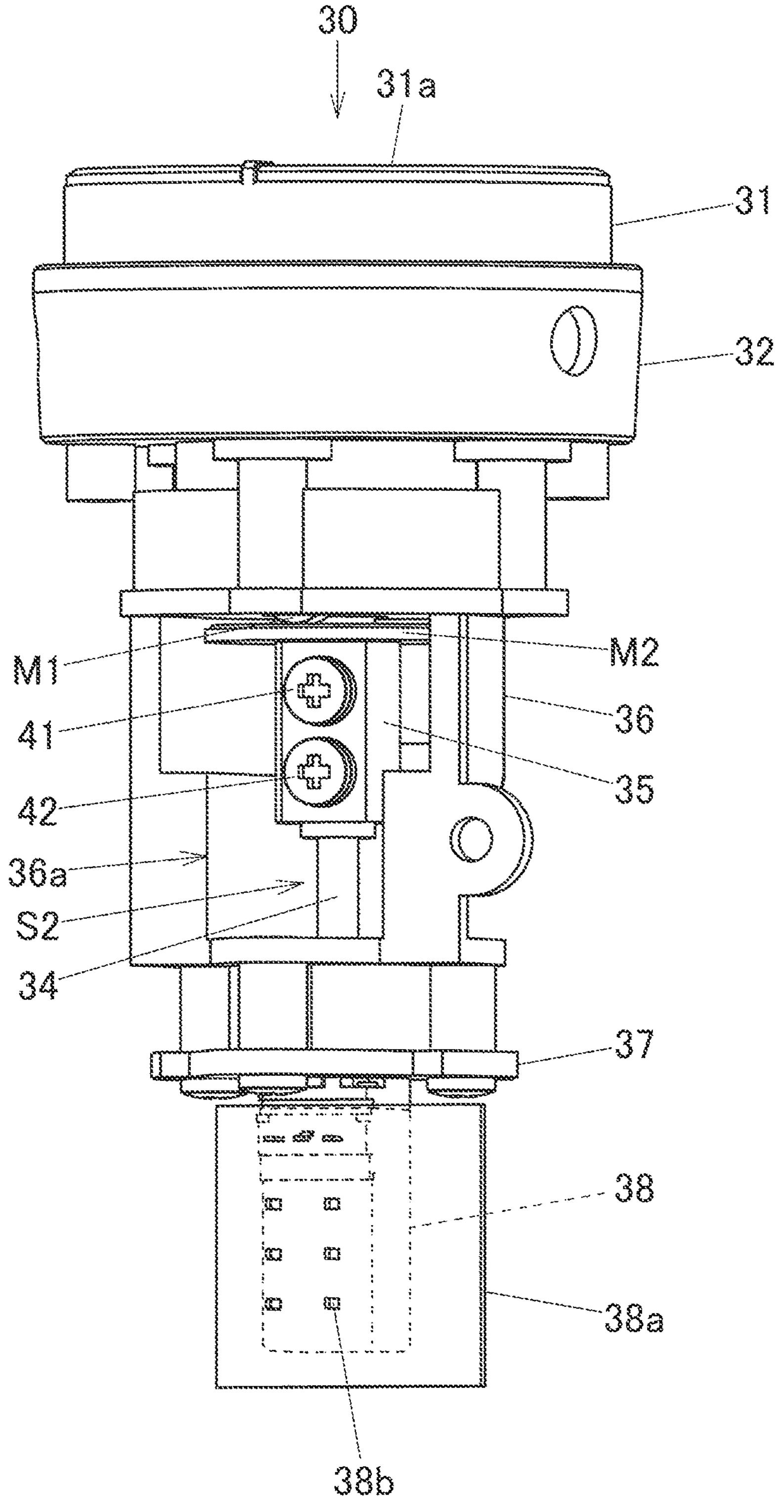
FIG. 3 is a perspective view of the volume knob according to the embodiment as viewed obliquely from a side.

The volume knob 30 is a push switch for activating a so-called alternate operation and has a push unit (button) 31 (refer to FIGS. 2 and 3). In the volume knob 30, the push unit 31 is enabled to move in either of an upward direction and a downward direction which is determined in accordance with a positional state of the push unit 31 when a user pushes the push unit 31. Specifically speaking, in the volume knob 30, in an initial state, an upper surface of the push unit 31 (hereinafter, referred to as a "push surface 31*a*") is held in a state in which the push surface 31*a* is positioned slightly downwards than the upper surface panel 20*a* (a state shown in FIG. 4, which is hereinafter referred to as an "off state (second state)"). When the push surface 31*a* is pushed, the push surface 31*a* is pushed back to be put in a state in which the push surface 31*a* protrudes further upwards than the upper surface panel 20*a* (a state shown in FIG. 5, which is hereinafter referred to as an "on state (first state)"). In the electronic keyboard instrument 1, the volume of a note sound can electrically be controlled by gripping to rotate the push unit 31 when the volume knob 30 is in the on state. Here, pushing operation of the push unit 31 is not necessarily limited to pushing downward. It can be in any direction that can push the push unit 31, and depending on the installation direction of the volume knob 30, it can also be sideways or the like.

As shown in FIGS. 2 to 5, the volume knob 30 includes, in addition to the push unit 31, an accommodating unit (accommodation) 32 for accommodating the push unit 31, a first shaft unit (shaft) 33 having a shaft shape and connected to a lower side of the push unit 31, a second shaft unit 34 having a shaft shape and connected to a lower end of the first shaft unit 33, a connector 35 for connecting the first shaft unit 33 and the second shaft unit 34 together, a case unit (case) 36 for accommodating the connector 35 in such a manner as to move vertically, a support plate 37 for supporting the case unit 36, and a mechanism unit (a holding mechanism) 38 which incorporates a gear, a cam, a spring, and the like which make up a mechanism for performing an alternate operation (hereinafter, referred to as an alternate mechanism). The volume knob 30 is mounted in an interior of the upper case 22 and is connected with the control circuit board inside the case 20 via wiring, not shown.

The push unit 31 has substantially a circular cylindrical shape and is sized so that an outer circumferential surface thereof can be gripped with finger and thumb. The push unit 31 can be rotated in its circumferential direction. In other words, the push unit 31 is configured to be rotated around an axis of the first shaft unit 33. The accommodating unit 32 has substantially a bottomed circular cylindrical shape which is opened on an upper side and is provided in such a manner as to surround an outer circumference of the push unit 31. An accommodating space S1 for accommodating the push unit 31 is provided inside the accommodating unit 32. An opening in the upper side of the accommodating unit 32 constitutes a accommodating opening 32*a*. An open surface of the accommodating opening 32*a* is provided so as to be substantially level with the upper surface panel 20*a* (refer to FIG. 4). A first through hole 32*b* is provided in a lower portion of the accommodating unit 32 in such a manner as to penetrate the lower portion in the up-down direction. A part of the first shaft unit 33 is accommodated in the first through hole 32*b*. The accommodating unit 32 is screwed to an upper portion of the case unit 36 for connection.

The case unit 36 has substantially a circular cylindrical shape and includes a moving space (space) S2 defined in an interior thereof. A left side of the moving space S2 is opened, whereby a first opening 36*a* is defined. Additionally, an opening is provided in a part of a right side portion of the moving space S2, whereby a second opening 36*b* is defined. The first shaft unit 33 extends so that an axial direction thereof coincides with the up-down direction, and an upper end portion thereof is connected to the push unit 31 with a screw. The first shaft unit 33 extends downwards from a central position of the push unit 31, passes through the first through hole 32*b*, and a lower portion thereof is exposed inside the moving space S2. A first bearing unit 39*a* having substantially a circular cylindrical shape is provided between the first shaft unit 33 and the first through hole 32*b* in such a manner as to be fitted in the first through hole 32*b*, whereby the first bearing unit 39*a* supports the first shaft unit 33 slidably in the up-down direction. A cut-out portion is provided in a lower end portion of the first shaft unit 33 in such a manner as to extend in the upward direction, whereby the first shaft unit 33 is given a second lower surface 33*b* which is flat in the front-back direction and the left-right direction.

The support plate 37 is formed as a plate-shaped unit which expands in the front-back direction and the left-right direction and is fastened to a lower portion of the case unit 36 with a screw for connection to thereby support the case unit 36. The support plate 37 includes a circular through hole which is provided in such a manner as to penetrate the support plate 37 in the up-down direction and a protrusion 37*b* having substantially a circular cylindrical shape which protrudes in the up-down direction along a circumferential edge of the through hole. A second through hole 37*a* is defined by an inner wall of the protrusion 37*b*, and the second shaft unit 34 extending in the up-down direction is inserted into the second through hole 37*a*. The second shaft unit 34 extends in such a manner that an axial direction thereof coincides with the up-down direction, and a lower end portion of the second shaft unit 34 is connected to the alternate mechanism. The second shaft unit 34 penetrates the second through hole 37*a*, and an upper end portion of the second shaft unit 34 is exposed within the moving space S2. A second bearing unit 39*b* having substantially a circular cylindrical shape is provided between the second shaft unit 34 and the second through hole 37*a* in such a manner as to be fitted in the second through hole 37*a*, whereby the second bearing unit 39*b* supports the second shaft unit 34 slidably in the up-down direction. An internal thread is provided in an outer circumferential surface of the second bearing unit 39*b*, whereby the second bearing unit 39*b* is fastened to the support plate 37 by a nut unit N which is screwed in the internal thread.

The connector 35 has substantially a prism-like shape and is installed inside the moving space S2 so as to connect the first shaft unit 33 and the second shaft unit 34 together. Specifically speaking, the lower end portion of the first shaft unit 33 is connected to the connector 35 with a first screw 41 which is screwed into an upper portion of the connector 35, and an upper end portion of the second shaft unit 34 is connected to the connector 35 with a second screw 42 which is screwed into a lower portion of the connector 35. As a result, the first shaft unit 33 and the second shaft unit 34 are connected together vertically in such a manner that the first shaft unit 33 and the second shaft unit 34 are positioned on the same axis. The first shaft unit 33, the second shaft unit 34, and the connector 35, which are connected to one another, are allowed to move freely in the up-down direction within the moving space S2 as a pushing operation is performed on the push unit 31.

The mechanism unit 38 has substantially a box-like shape which is vertically long and is configured to impart an alternate operation to the second shaft unit 34 in the up-down direction as a result of the second shaft unit 34 being connected to the alternate mechanism provided in an interior of the mechanism unit 38. As a result, an alternate operation is imparted to the connector 35, the first shaft unit 33 which is connected to the second shaft unit 34 via the connector 35, and the push unit 31 which is connected to the first shaft unit 33 in the up-down direction via the second shaft unit 34. That is, when an alternate operation is imparted, the push unit 31, the first shaft unit 33, the second shaft unit 34, and the connector 35 move together in the up-down direction on the same axis. A terminal board 38*a* is provided on a left side of the mechanism unit 38. The terminal board 38*a* is connected with the mechanism unit 38 via multiple terminal groups 38*b* which protrude from the left side of the mechanism unit 38.

Figure 4:
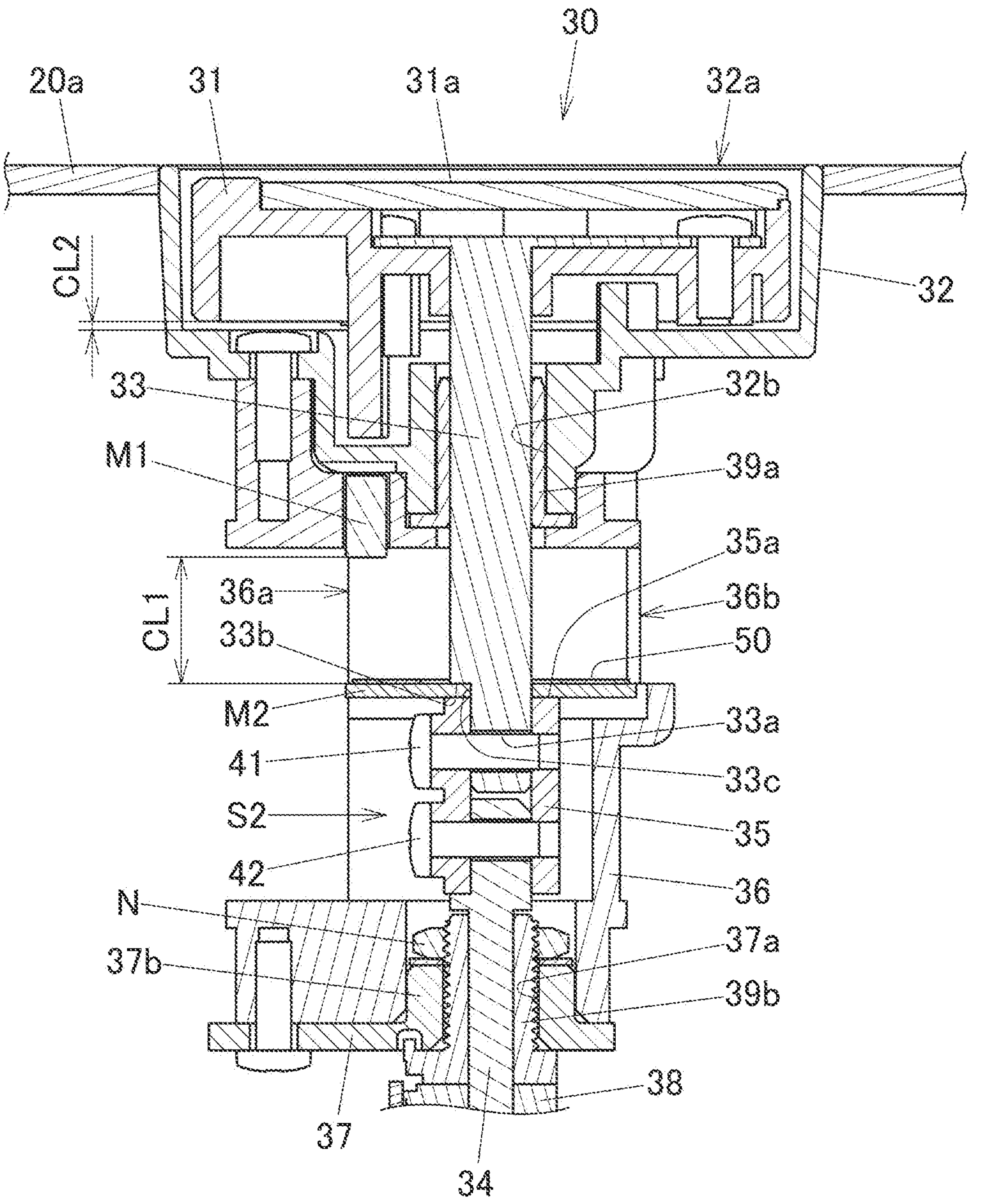
FIG. 4 is a vertical sectional view of the volume knob according to the embodiment in an off state.
Figure 5:
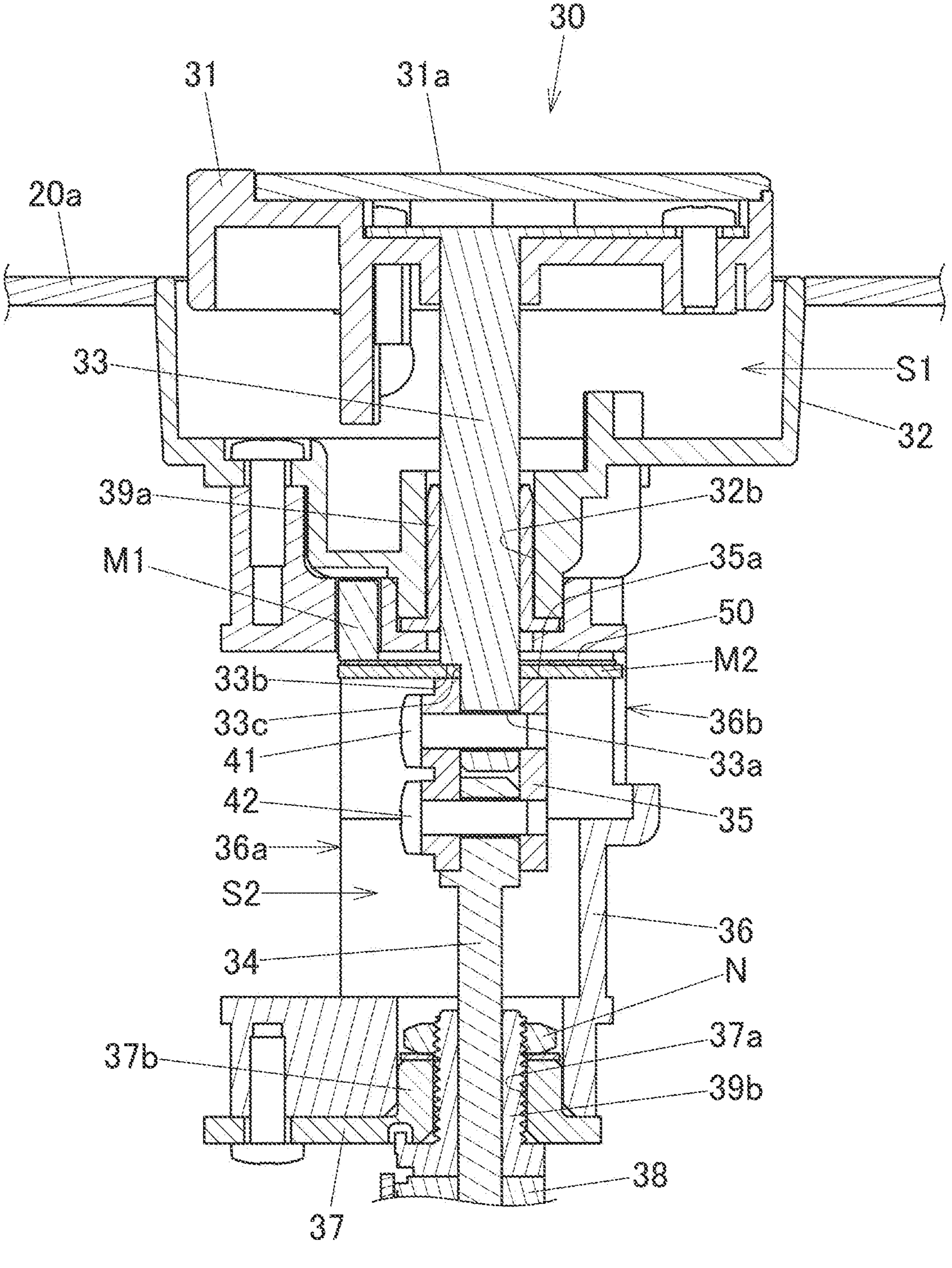
FIG. 5 is a vertical sectional view of the volume knob according to the embodiment in an on state.

Here, as shown in FIGS. 3 to 5, one permanent magnet (magnet) M1 having substantially a circular cylindrical shape is fixed to a location lying on a left side of an upper portion of the case unit 36 (in other words, an eccentric position on the upper portion of the case unit 36) and spaced apart the first shaft unit 33. The permanent magnet M1 is disposed vertically in such a manner that a cylindrical axis direction thereof coincides with the left-right direction. A lower portion of the permanent magnet M1 is exposed within the moving space S2 so as to face a plate surface of a plate-shaped magnetic body M2 formed of iron or containing iron, which will be described next. Here, a magnetic strength of the permanent magnet M1 is not limited in any way, and hence, the magnetic strength of the permanent magnet M1 can be adjusted as required in accordance with an attraction force for the magnetic body M2 which is provided by a magnetic field generated by the permanent magnet M1. In the present embodiment, the magnetic strength of the permanent magnet M1 is adjusted in accordance with a rotation torque of the push unit 31 which is configured to rotate around the axis of the first shaft unit 33. Additionally, as a modified example, multiple permanent magnets M1 may be provided on the case unit 36.

On the other hand, the magnetic body M2 having substantially a circular disc shape is fixed around an axis of the portion of the first shaft unit 33 which is positioned within the moving space S2 as a strong magnetic body. A first lower surface 33*a* as a lowermost surface of the first shaft unit 33 and a second lower surface 33*b* which is positioned slightly higher than the first lower surface 33*a* are provided. When seeing an outer edge of the first lower surface 33*a* and an outer edge of the second lower surface 33*b* from below, they constitute the same circular shape as a circular shape defined around the axis of the first shaft unit 33. A hole is provided substantially in a central position of the magnetic body M2 which corresponds to the first lower surface 33*a* of the first shaft unit 33 in such a manner as to penetrate the magnetic body M2 in the up-down direction. This hole so provided allows the magnetic body M2 to be fitted on the first shaft unit 33 from a lower side of the first lower surface 33*a* of the first shaft unit 33, whereby a part of an upper surface of the magnetic body M2 is brought into abutment with the second lower surface 33*b*, and an inner wall of the magnetic body M2 which defines the hole is brought into abutment with an inner wall 33*c* of the first shaft unit 33 defined between the first lower surface 33*a* and the second lower surface 33*b* of the first shaft unit 33. The magnetic body M2 is fixed in this state by being sandwiched in the up-down direction by the second lower surface 33*b* of the first shaft unit 33 and an upper end portion 35*a* of the connector 35.

As the push unit 31 performs an alternate operation, the magnetic body M2 moves together with the connector 35 in the up-down direction within the moving space S2. An annular cushion sheet (cushion) 50 is affixed to the upper surface of the magnetic body M2 so as to prevent the permanent magnet M1 and the magnetic body M2 from being damaged even though the permanent magnet M1 and the magnetic body M2 are caused to collide with each other with a strong force. Examples of the cushion sheet 50 include polyurethane and polyethylene foam sheets. In the off state, the permanent magnet M1 and the magnetic body M2 are spaced apart from each other with a sufficient clearance CL1 defined therebetween in such a manner that no attraction force generated by a magnetic force acts therebetween (refer to FIG. 4).

Figure 7B:
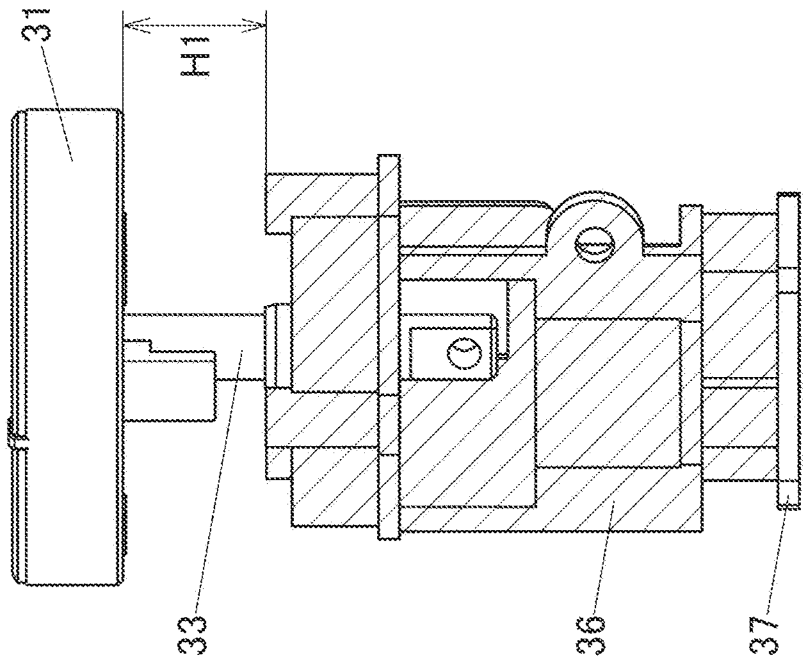
Figure 7A:
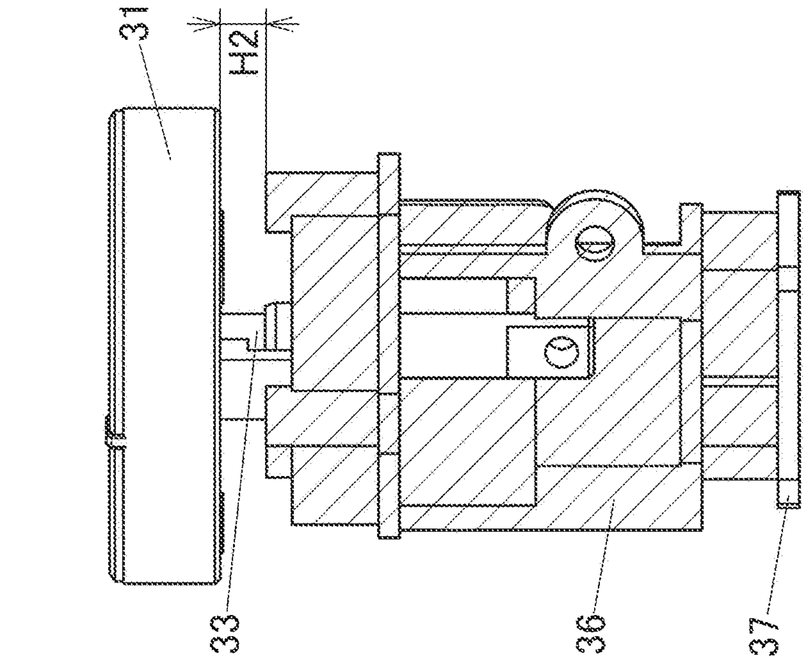

As mentioned above, in the volume knob 30, the permanent magnet M1 and the magnetic body M2 are attracted to each other by a magnetic force along the vertical direction in the on state, in which the push unit 31 protrudes upward from the case unit 36 more than in the off state. In other words, the distance H1 between the case unit 36 (the part with hatching in FIGS. 7A and 7B) and the push unit 31 in the on state (see FIG. 7B) is larger than the distance H2 between the case unit 36 and the push unit 31 in the off state (see FIG. 7A). Therefore, in the on state, the push part 31 protrudes upward from the case unit 36 by the difference in both distances (H1–H2) more than in the off state.

Figure 6:
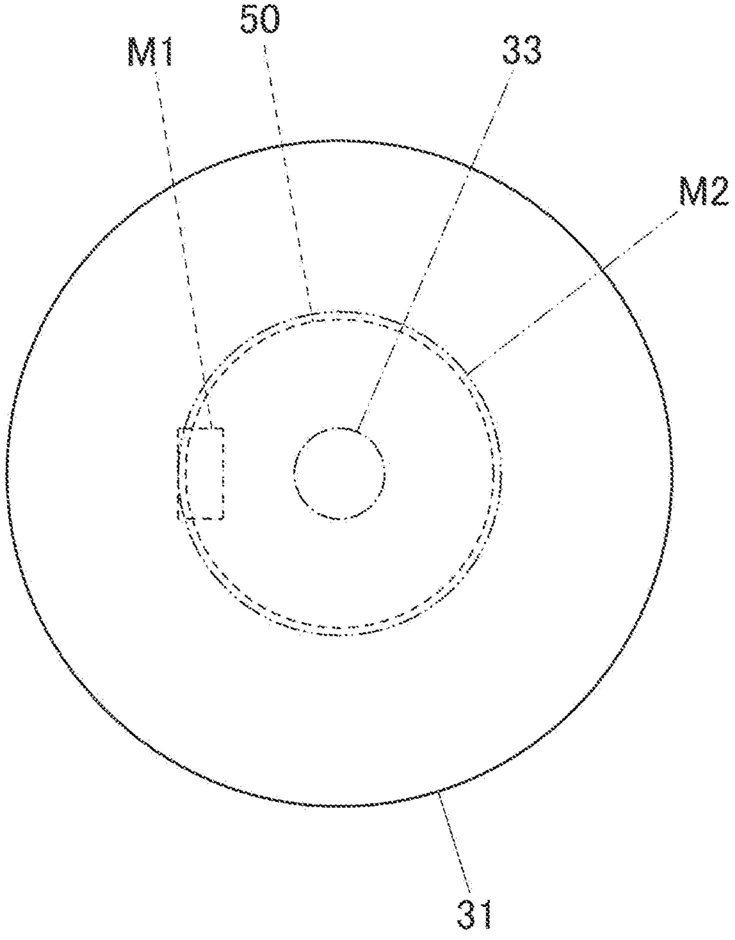
FIG. 6 is a top view of the volume knob according to the embodiment as viewed from above.

In addition, FIG. 6 is a perspective view in which the volume knob 30 is viewed from above the electronic keyboard instrument 1 along the axial direction of the first shaft unit 33. The first shaft unit 33 is disposed in such a manner as to be superposed on a circular center position of the push unit 31 whose upper surface is circular. Then, the magnetic body M2 is provided in such a manner as to be positioned concentrically with the push unit 31 and the first shaft unit 33, and an outer edge of the magnetic body M2 lies inside an outer edge of the push unit 31 and outside an outer edge of the first shaft unit 33 which is defined around the axis thereof. The permanent magnet M1 is not provided along a full circumference of the first shaft unit 33 which is defined around the axis thereof and has substantially a rectangular shape as viewed from above.

The magnetic body M2 has a larger area than the permanent magnet M1 in the plane direction along the front-back and left-right direction, such that it always overlaps the permanent magnet M1 when viewed from above, regardless of how it rotates to the permanent magnet M1 which is fixed within the electronic keyboard instrument 1 and does not move. The permanent magnet M1 and the magnetic body M2 are positioned inside the outer edge of the push unit 31 when viewed from above. Therefore, there is no need to place this attraction mechanism between the permanent magnet M1 and the magnetic body M2 outside the push unit 31 when viewed from above, which allows the volume knob 30 to have a compact structure.

Next, referring to FIGS. 4 and 5, an operation of the volume knob 30 will be described. In the volume knob 30, in the off state, the push unit 31 is pushed further downwards than the open surface of the accommodating opening 32*a* by the alternate mechanism, and the push unit 31 is held in such a state that a slight clearance CL2 is provided between the push unit 31 and an open bottom surface of the accommodating opening 32*a* (refer to FIG. 4). In the off state, the connector 35 is positioned in a lower portion within the moving space S2. When the push unit 31 is pushed by an extent corresponding to the clearance CL2 in the off state, the connector 35 is caused to move upwards within the moving space S2 and the push unit 31 is pushed back upwards by the alternate mechanism, resulting in the on state.

In the volume knob 30, when the push unit 31 is pushed back upwards in the way described above (the push unit 31 shifts from the off state to the on state), the permanent magnet M1 and the magnetic body M2 get closer to each other as the connector 35 moves upwards within the moving space S2, whereby an attractive force, due to the magnetic field oriented in the axial direction of the first axis part 33 or the direction of movement of the first axis part 33, acts between the permanent magnet M1 and the magnetic body M2. As a result, the upward movement of the permanent material M2, and the connector 35, the first shaft unit 33, and the second shaft unit 34 which connect to the magnetic body M2 is accelerated. When the connector 35 reaches the upper portion of the moving space S2, the magnetic body M2 is attracted by the permanent magnet M1, resulting in the on state. At this time, since the magnetic body M2 faces the permanent magnet M1 via the cushion sheet 50, an impact is mitigated which will be generated when the magnetic body M2 is brought into abutment with the permanent magnet M1 via the cushion sheet 50.

In the on state, the push unit 31 is held in such a state that the push surface 31*a* protrudes further upwards than the upper surface panel 20*a* by the alternate mechanism (refer to FIG. 5), whereby the magnetic body M2 and the permanent magnet M1 are caused to attract each other, thereby making it difficult for the magnetic body M2 and the permanent magnet M1 to separate from each other. The magnetic body M2 is provided in a ring-like fashion so as to surround the axis of the first shaft unit 33, and in the state shown in FIG. 5, the magnetic body M2 rotates as the user performs a rotational operation to the protruding push unit 31. In this case, since the permanent magnet M1 is positioned on the upper surface side of the magnetic body M2, the permanent magnet M1 attempts to attract the magnetic body M2 at all times, whereby the magnetic body M2, the first shaft unit 33, and the push unit 31 rotate while the permanent magnet M1 is sliding over the magnetic body M2 (the cushion sheet 50) in such a state that the magnetic body M2 is attracted by the permanent magnet M1.

In addition, since the permanent magnet M1 is not large enough to be superposed on the magnetic body M2 along a full circumferential area of the magnetic body M2, the magnetic body M2 and the push unit 31 to which the magnetic body M2 is fixed are not subject to an excessive attraction by the permanent magnet M1. As a result, in the on state, the user can grip to rotate smoothly the protruding push unit 31 while suppressing the rattling of the push unit 31, thereby making it possible to control the volume of a note sound. In the on state, the connector 35 is positioned in the upper portion within the moving space S2. When the push unit 31 is pushed by an extent corresponding to a protruding amount from the upper surface panel 20 in the on state, the connector 35 moves downwards within the moving space S2, and the push unit 31 interferes with the open bottom surface of the accommodating opening 32*a*. Then, the push unit 31 is pushed back slightly upwards by the alternate mechanism, resulting in the off state.

In the volume knob 30, when the upwardly protruding push unit 31 is pushed in the way described above (the push unit 31 shifts from the on state to the off state), the magnetic body M2 which is attracted by the permanent magnet M1 moves away from the permanent magnetic M1, and the magnetic body M2 moves downwards together with the connector 35 within the moving space S2. As a result, when pushing the push unit 31 from the on state, a force is necessary by which the magnetic body M2 is caused to move away from the permanent magnet M1 against the magnetic force, and a resistance is generated at a moment when the magnetic body M2 is caused to move away from the permanent magnet M1. When the magnetic body M2 is caused to move away from the permanent magnet M1, and the connector 35 reaches the lower portion within the moving space S2 to thereby be pushed back slightly, the off state is provided in which the sufficient clearance CL1 is provided between the permanent magnet M1 and the magnetic body M2.

Thus, as has been described heretofore, the volume knob 30 according to the present embodiment includes a case unit 36, a push unit 31 provided on the case unit 36, and can be operated by pushing, and a first shaft unit 33 provided in the moving space S2 within the case unit 36 and configured to move together with a push unit 31 along the up-down direction in a case in which the push unit 31 has been operated. In addition, within the moving space S2, the permanent magnet M1 is fixed to either the case unit 36 or the first shaft unit 33, and the magnetic body M2 is fixed to the remaining one. The permanent magnet M1 and the magnetic body M2 are attracted to each other by a magnetic force along the up-down direction in the on state in which the push unit 31 protrudes from the case unit 36 upward from the case unit 36 more than in the off state. Specifically, by moving the first shaft unit 33, they are separated in the off state and during the switching from the off state to the on state, and in the on state, the magnetic body M2 is attracted by the magnetic force to make it more difficult to separate, or it becomes more difficult to separate.

With the volume knob 30 configured in the way described above, in the on state, the magnetic body M2 provided on the first shaft unit 33 is attracted by the permanent magnet M1 provided on the case unit 36 so that the magnetic body M2 and the permanent magnet M1 hardly move away from each other, whereby the positional deviation of the first shaft unit 33 with respect to the case unit 36 is suppressed, and the first shaft unit 33 and the push unit 31 connected to the first shaft unit 33 are restrained from rattling. In this way, since the permanent magnet M1 attracts the magnetic body M2 only in the on state, there is no risk of the permanent magnet M1 and the magnetic body M2 badly affecting the alternate operation of the volume knob 30. In addition, even in the case that there occurs a positional deviation of the first shaft unit 33 in the up-down direction when the push unit 31 shifts from the off state to the on state, a protrusion failure of the push unit 31 due to an insufficient upward movement of the first shaft unit 33 can be prevented because the magnetic body M2 and the permanent magnet M1 attracts each other. As a result, the protrusion and withdrawal (pushing in) of the push unit 31 can preferably be realized, thereby making it possible to enhance the operation quality of the volume knob 30.

Further, with the volume knob 30 described above, when the push unit 31 is pushed from the on state, the push unit 31 and the first shaft unit 33 move downwards, causing the magnetic body M2 to move away from the permanent magnet M1, whereby a resistance is generated in the push unit 31. As a result, a clicking feeling felt when the push unit 31 is pushed from the on state can be enhanced more than with a normal switch apparatus which performs an alternate operation.

With the volume knob 30, the magnetic body M2 is provided in a ring-like fashion so as to surround the axis of the first shaft unit 33. With this configuration, in the case that the push unit 31 connected to the first shaft unit 33 is rotated in the on state, the permanent magnet M1 slides over the magnetic body M2 while the magnetic body M2 is being attracted by the permanent magnet M1. As a result, in the on state, the push unit 31 can be rotated while the push unit 31 is restrained from rattling as a result of the attraction between the permanent magnet M1 and the magnetic body M2 being maintained, whereby the operation quality of the volume knob 30 can be enhanced further.

With the volume knob 30, the permanent magnet M1 is provided in the eccentric position around the axis of the first shaft unit 33. As a result, in the on state, a resistance is easy to be felt in the position which overlaps the permanent magnet M1 in the up-down direction over the push surface 31*a* of the push unit 31 when the push surface 31*a* is pushed, whereas a resistance is hardly felt in a position which does not overlap the permanent magnet M1 in the up-down direction over the push surface 31*a* when the push surface 31*a* is pushed. In this way, the degree of resistance felt when the push surface 31*a* is pushed can be changed in accordance with a position over the push surface 31*a*.

With the volume knob 30, as the modified example, the multiple permanent magnets M1 may be provided around the axis of the first shaft unit 33. For example, multiple permanent magnets M1 may be provided around the axis of the first shaft unit 33 at predetermined intervals on the upper portion of the case unit 36. In this case, since the multiple permanent magnets M1 attract the magnetic body M2 over substantially the whole of the plate surface of the magnetic body M2, the attraction force between the permanent magnets M1 and the magnetic body M2 can be enhanced. In addition, the resistance felt when the push surface 31*a* is pushed from the on state can be made uniform irrespective of a position over the push surface 31*a*.

With the volume knob 30, the permanent magnet M1 is provided in the location apart from the axis of the first shaft unit 33. In the event that the permanent magnet M1 and the magnetic body M2 are not provided on the volume knob 30, as the first shaft unit 33 protrudes longer in the up-down direction in the on state, the push unit 31 rattles more due to a backlash. The suppression effect of the rattling attributed to the attraction between the permanent magnet M1 (the case unit 36) and the magnetic body M2 (the first shaft unit 33) can be enhanced by providing the permanent magnet M1 in the location which lies a certain distance or more apart from the axis of the first shaft unit 33 as described above.

With the volume knob 30, the cushion sheet 50 is provided between the permanent magnet M1 and the magnetic body M2 (the upper surface of the magnetic body M2), and in the on state, the permanent magnet M1 and the magnetic body M2 attract each other via the cushion sheet 50. As a result, the impact can be mitigated which is generated as a result of the permanent magnet M1 attracting the magnetic body M2 when the push unit 31 shifts from the off state to the on state, and the resistance can be mitigated which is generated as a result of the magnetic body M2 moving away from the permanent magnet M1 when the push unit 31 shifts from the on state to the off state.

With the volume knob 30, the push unit 31 is configured to rotate around the axis of the first shaft unit 33, and the magnetic strength of the permanent magnet M1 is adjusted in accordance with the rotation torque of the push unit 31. As a result, the feeling felt when the push unit 31 is gripped to be rotated in the on state can be made appropriate, whereby the operation quality of the volume knob 30 can be enhanced further.

In addition, the electronic keyboard instrument 1 according to the present embodiment includes the volume knob 30. As a result, the electronic keyboard instrument 1 can be realized in which the volume knob 30 whose operation quality is improved by suppressing the rattling or the like thereof can be pushed and rotated.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents. For example, while the embodiment exemplifies the configuration in which the permanent magnet is provided on the case unit, and the magnetic body is provided on the first shaft unit, a configuration may be adopted in which the magnetic body is provided on the case unit, and the permanent magnet is provided on the first shaft unit. In addition, a configuration may be provided in which a mechanism is provided which is configured to detect a timing when the push unit shifts from the off state to the on state and the on state, and an electromagnet configured to generate a magnetic force at a timing when the push unit shifts from the off state to the on state and in the on state is provided in place of the permanent magnet. In this case, the magnetic body and the electromagnet attract each other at the timing when the push unit shifts from the off state to the on state and in the on state, but there is no such case in the off state that the magnetic body and the electromagnet attract each other because no magnetic force is generated in the off state. Additionally, in the embodiment described above, the electronic keyboard instrument is described as electronic equipment; however, the invention is not limited thereto, and hence, the invention can also be applied to any electronic equipment as long as it includes a hardware switch.

What is claimed is:

1. A switch apparatus comprising:

a case;

a button provided on the case and being operable by pushing from a first direction; and a shaft provided in a space within the case and configured to move together with the button along an axial direction in response to an operation on the button, wherein:

within the space, at least one magnet is fixed to one of the case or the shaft, and at least one magnetic body is fixed to a remaining one of the case or the shaft, the at least one magnet and the at least one magnetic body are attracted to each other by a magnetic force along the axial direction in a first state in which the button protrudes from the case in the first direction more than in a second state, the button is configured to rotate around the axis of the shaft, and a rotation torque of the button is adjusted in accordance with a magnetic strength of the at least one magnet.

2. The switch apparatus according to claim 1, further comprising:

a holding mechanism that, in response to the operation on the button being performed repeatedly, is configured to switch alternately between the first state and the second state, the second state being a state in which the button is pushed in from the first state to thereby cause the at least one magnet and the at least one magnetic body to move away from each other.

3. The switch apparatus according to claim 1, wherein one of the at least one magnet or the at least one magnetic body is provided in a ring-like fashion in such a way as to surround an axis of the shaft.

4. The switch apparatus according to claim 1, wherein one of the at least one magnet or the at least one magnetic body is provided in an eccentric position around an axis of the shaft.

5. The switch apparatus according to claim 1, wherein one of the at least one magnet or the at least one magnetic body comprises a plurality of magnets or a plurality of magnetic bodies provided around an axis of the shaft in a plurality of locations respectively.

6. The switch apparatus according to claim 1, wherein one of the at least one magnet or the at least one magnetic body is provided at a location apart from an axis of the shaft.

7. The switch apparatus according to claim 1, wherein the at least one magnet and the at least one magnetic body are disposed in positions which overlap the button when viewed from above.

8. The switch apparatus according to claim 1, further comprising:

a cushion provided between the at least one magnet and the at least one magnetic body, wherein the at least one magnet and the at least one magnetic body are attracted to each other via the cushion in the first state.

9. Electronic equipment comprising:

the switch apparatus according to claim 1; and an electric circuit configured to be controlled electrically in response to operation of the switch apparatus.

10. The switch apparatus according to claim 1, wherein:

one of the at least one magnet or the at least one magnetic body is provided in an eccentric position around an axis of the shaft, the other of the at least one magnet or the at least one magnetic body is provided in a ring-like fashion so as to surround the axis of the shaft, and while the one of the at least one magnet or the at least one magnetic body rotates about the axis of the shaft together with the button, the at least one magnet and the at least one magnetic body remain positioned so as to at least partially overlap each other when viewed from above.

* * * * *